United States Patent

D'Herripon

[11] Patent Number: 5,951,421
[45] Date of Patent: *Sep. 14, 1999

[54] CONTINUOUSLY VARIABLE TRANSMISSION INCLUDING OPTIMIZING ELECTRIC MOTOR

[75] Inventor: Bastiaan Andreas D'Herripon, Tilburg, Netherlands

[73] Assignee: Van Doorne's Transmissie B.V., Tilburg, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/716,734

[22] Filed: Sep. 23, 1996

[30] Foreign Application Priority Data

Sep. 25, 1995 [NL] Netherlands ............................. 1001279

[51] Int. Cl.⁶ ............................. F16D 39/00; F16D 13/76; F16H 59/00
[52] U.S. Cl. ................................. 474/28; 474/18; 192/11; 60/488
[58] Field of Search .................................. 474/8, 18, 28, 474/70; 192/4 R, 11; 60/488, 489

[56] References Cited

U.S. PATENT DOCUMENTS

| | | | |
|---|---|---|---|
| 4,551,119 | 11/1985 | Sugaya et al. | 474/18 |
| 4,702,725 | 10/1987 | Kuono et al. | 474/18 |
| 4,710,151 | 12/1987 | Sakai | 474/18 |
| 4,734,082 | 3/1988 | Tezuka | 474/18 |
| 5,094,652 | 3/1992 | Sakakibara et al. | 474/8 |
| 5,168,975 | 12/1992 | Bernhardt et al. | 192/0.096 |
| 5,187,995 | 2/1993 | Nakano . | |
| 5,203,233 | 4/1993 | Hattori et al. | 474/18 |
| 5,222,417 | 6/1993 | Sato | 474/18 |
| 5,230,663 | 7/1993 | Reniers | 474/18 |
| 5,232,406 | 8/1993 | Sato | 474/18 |
| 5,256,109 | 10/1993 | Winkelmann et al. | 474/18 |
| 5,361,744 | 11/1994 | Teraoka | 474/18 |
| 5,431,602 | 7/1995 | Hendricks et al. | 474/28 |
| 5,649,876 | 7/1997 | Morishita | 424/18 |
| 5,665,022 | 9/1997 | Niiyama | 474/18 |
| 5,665,023 | 9/1997 | Aoki et al. | 474/28 |
| 5,667,448 | 9/1997 | Friedmann | 474/18 |

FOREIGN PATENT DOCUMENTS

| | | |
|---|---|---|
| 0 170 462 | 2/1986 | European Pat. Off. . |
| 0 423 536 | 4/1991 | European Pat. Off. . |
| 0 502 263 | 9/1992 | European Pat. Off. . |
| 41 34 268 | 4/1992 | Germany . |
| 43 31 266 | 3/1995 | Germany . |
| 61-167762 | 7/1986 | Japan . |
| 2 256 244 | 12/1992 | United Kingdom . |
| 2 273 323 | 6/1994 | United Kingdom . |

*Primary Examiner*—John A. Jeffery
*Assistant Examiner*—Matthew A. Kaness
*Attorney, Agent, or Firm*—Young & Thompson

[57] ABSTRACT

A continuously variable transmission provided with a variator for adjusting the transmission ratio of the transmission and one or more hydraulic circuits for lubrication, cooling and transmission control, one or more pumps being installed for the hydraulic circuit. The transmission comprises at least one electric motor to give the transmission better sizing and an improved efficiency.

20 Claims, 3 Drawing Sheets

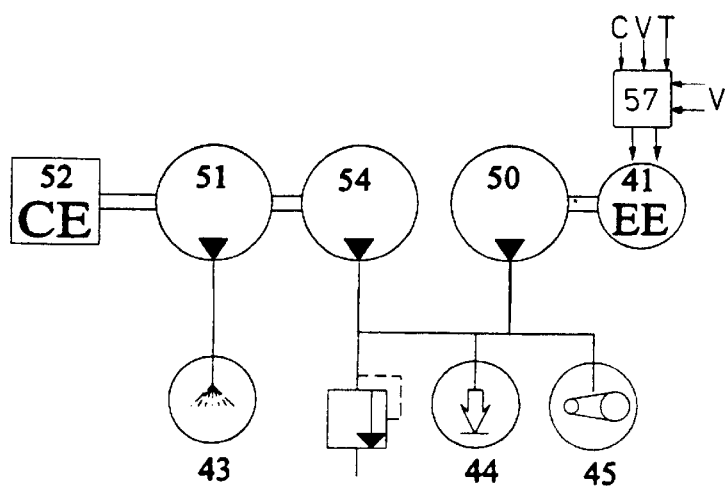
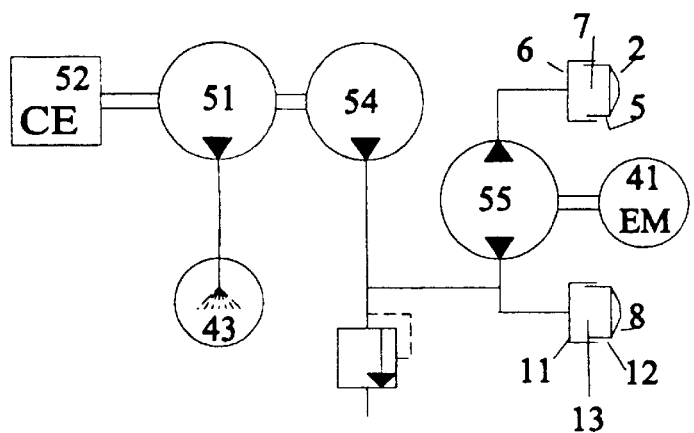
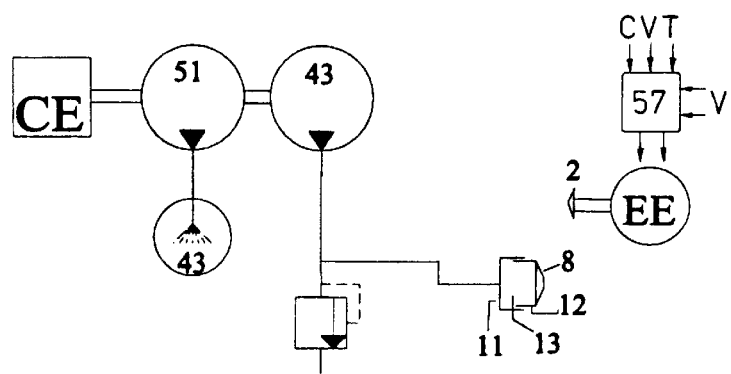

CONTINUOUSLY VARIABLE TRANSMISSION INCLUDING OPTIMIZING ELECTRIC MOTOR

BACKGROUND OF THE INVENTION

The invention relates to a continuously variable transmission provided with a variator for adjusting the transmission ratio of the transmission and one or more hydraulic circuits, for example for lubrication, cooling and transmission control, one or more pumps being installed for the hydraulic circuits.

DESCRIPTION OF THE RELATED ART

A transmission of this type is disclosed in European Patent 0 502 263 and is used in motor vehicles in particular. With a transmission of this type, in addition to the main power train, from a drive unit via the transmission to a unit to be driven, auxiliary power trains are needed to operate the transmission. In this context one can think, in particular, of the drive for one or more pumps in the hydraulic circuits for lubrication, cooling and transmission control. In this regard European Patent 0 502 263 discloses that these auxiliary power trains must always be sufficiently large to meet the desired power requirement. This frequently means that the components used in these power trains are oversized and appreciable power loss can occur, to the detriment of the efficiency of the transmission. The loss in efficiency can to some extent be restricted by, as proposed in EP 0 502 263, using, for example, two pumps, one of which can be switched on and off, but the efficiency is still not optimum when this measure is employed.

SUMMARY OF THE INVENTION

The aim of the invention is to overcome the said drawbacks and to provide a continuously variable transmission with improved sizing and efficiency. The continuously variable transmission according to the invention is characterised in that the transmission comprises an electric motor. By switching the electric motor on and off depending on the operating conditions of the transmission, optimum power can be supplied to the auxiliary power trains. By this means oversizing and efficiency loss of the auxiliary power trains is prevented. Moreover, in this case an optimum speed (revs) of the electric motor can be selected, so that there is no dependence on the (unknown variable) speed (revs) of another drive unit. With this arrangement, the electric motor is preferably controllable, so that when an electric motor is switched on the power supplied can be controlled depending on the operating conditions of the transmission.

According to a further development of the invention, at least one of the pumps or pump components is drivable by the electric motor. By this means the fluid flow to be pumped around a hydraulic circuit can be controlled as a function of the operating conditions of the transmission, which is beneficial for the efficiency and the sizing of the hydraulic circuit and the pump in particular. In this context the pump can, according to the invention, also be directly or indirectly drivable, for example by the use of a coupling, by a drive unit which can be connected to the transmission. This provides a possibility for selecting the most optimum pump drive depending on the operating conditions. For instance, according to the invention, the pump or the pump component can, in particular, be drivable by the drive unit during essentially steady-state operation of the transmission and by the electric motor essentially during dynamic operation.

According to a further characteristic of the invention, at least one of the non-electrically drivable pumps or pump components is connected to a hydraulic circuit for low pressure. Furthermore, according to the invention at least one of the electrically drivable pumps or pump components can be connected to a hydraulic circuit for high pressure. The pump which is not electrically driven can thus supply a hydraulic circuit for low pressure, which circuit in general demands a low stable flow rate. The high pressure hydraulic circuit, on the other hand, in general demands higher and in particular highly fluctuating flow rates, for which the electric motor is particularly suitable. Furthermore, it is possible for both a pump or pump component for a hydraulic circuit at high pressure and a pump or pump component for a hydraulic circuit at a low pressure to be driven by an electric motor.

According to the invention, both a pump or pump component drivable by an electric motor and a pump or pump component directly or indirectly drivable by a drive unit which can be connected to the transmission can be connected to a hydraulic circuit for high pressure. In particular, the pumps or pump components which are drivable by an electric motor can, with this arrangement, supply a higher flow to the hydraulic circuit than can the pumps which are drivable by the drive unit. In this way, the non-electrically driven pump supplies the basic flow and the electrically driven pump the supplementary desired flow.

The invention relates in particular to a continuously variable transmission provided with two pulleys, wherein each pulley is provided with two discs, at least one disc of which per pulley is axially movable by means of a displacement mechanism. Said displacement mechanism of at least one disc can, according to the invention, be directly or indirectly drivable by the electric motor. According to a further development, the displacement means comprise control cylinders, and, in a hydraulic link between the two cylinders, a pump is provided which is drivable by the electric motor. In this way the electric motor is able, in a very efficient manner and at the correct point in time, to drive the pump which causes fluid to flow from the one control cylinder to the other control cylinder. As a result, the flow losses remain minimal and the control is small and simple. A pump which is directly or indirectly drivable by a drive unit which can be connected to the transmission can also be connected to the hydraulic link. Said pump can then be used in particular to make up the customary leakage losses in the hydraulic circuit. Within the same concept, a displacement mechanism for one pulley can also be drivable by an electric motor and the drive mechanism for the other pulley can comprise a control cylinder which is coupled to a hydraulic circuit. In this way the electric motor can, for example, efficiently control the adjustment of the transmission ratio, while the pump is able to supply the less highly fluctuating flow for the line pressure for the pinching force for the drive belt between the pulleys.

In particular, according to the invention, the electric motor and/or the pump are controllable. Furthermore, the transmission can be provided with an accumulator to enable an additional power requirement to be met for a short time.

BRIEF DESCRIPTION OF THE DRAWINGS

The invention will be explained with reference to a drawing. In the drawing:

FIG. 5 shows, diagrammatically, a fourth embodiment of the transmission according to the invention;

FIG. 6 shows, diagrammatically, a fifth embodiment of the transmission according to the invention; and FIG. 7 shows, diagrammatically, a sixth embodiment of the transmission according to the invention.

DESCRIPTION OF THE PREFERRED EMBODIMENTS

Figure 1:
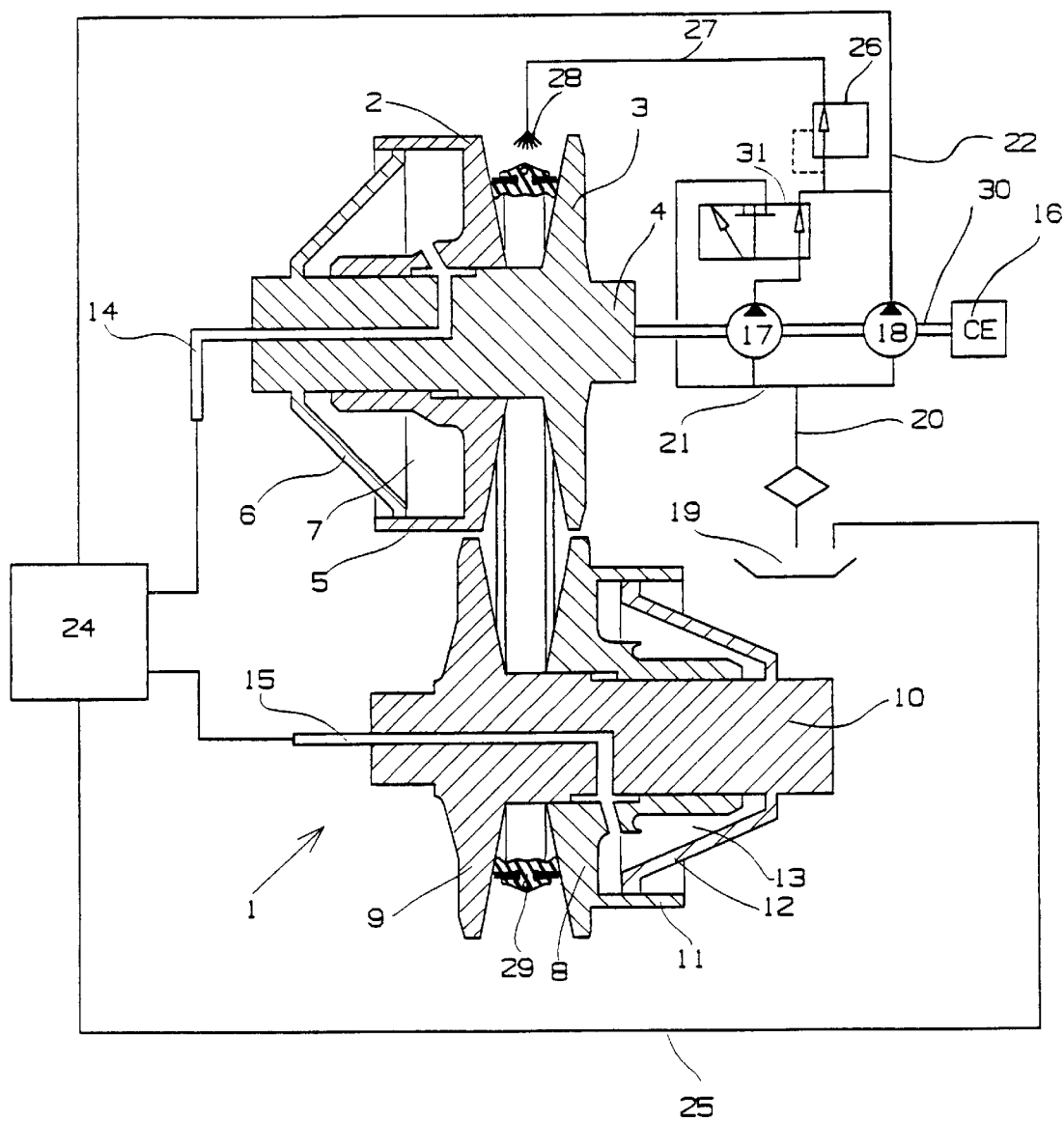
FIG. 1 shows, diagrammatically, a continuously variable transmission according to the prior art.

FIG. 1 shows, diagrammatically, a continuously variable transmission according to the prior art. Essentially the variator 1 is shown. The variator 1 comprises two pulleys with discs 2, 3 and 9, 8 respectively. The discs 2, 3 of the first pulley are arranged on the pulley shaft 4 and the discs 9, 8 of the second pulley are arranged on the pulley shaft 10. The discs 2 and 8, respectively, are axially movable over the pulley shafts 4 and 10, respectively. Said movement can be effected by displacement means, which in this case comprise a piston/cylinder assembly. With this arrangement the piston/cylinder assemblies on the first and the second pulley respectively each comprise a piston, 6 and 12 respectively, a cylinder, 5 and 11 respectively, and a cylinder chamber, 7 and 13 respectively, which is enclosed by said cylinder, 5 and 11 respectively. By supplying fluid to, and removing fluid from, the cylinder chambers 7 and 13, respectively, through the lines 14 and 15 respectively, the axial position of the movable discs 2 and 8 respectively is adjusted and, thus, the radial position of the drive belt 29 between the pulleys. The radial position of the drive belt 29 between the two pulleys is the determining factor for the transmission ratio of the transmission. In other respects it is assumed that the functioning of the continuously variable transmission is known. The pulley shaft 10 is, for example, directly or indirectly connected to the wheels of a motor vehicle. The pulley shaft 4 is directly or indirectly connected to a drive unit 16, for example an internal combustion engine 16, which drives the pulley shaft 4. Two further pumps 17 and 18 are mounted on the drive shaft 30 between the internal combustion engine 16 and the pulley shaft 4. Pumps 17 and 18 can, incidentally, also be two pump components of a single pump. The pumps 17 and 18 supply fluid at a certain flow rate and under a certain pressure to line 22, which is connected to a controller 24 which controls the flow to and from the cylinder chambers 7 and 13, respectively, via the lines 14 and 15, respectively. In general, but not necessarily, a pressure which must supply sufficient pinching force to prevent slipping of the drive belt between the pulleys is set in cylinder chamber 13, whilst a pressure and flow for adjustment to the correct transmission ratio are set in cylinder chamber 7. Surplus fluid is returned by controller 24 via line 25 to the fluid reservoir 19, from which the pumps 17 and 18 draw fluid via line 20.

It will be clear that the flow and pressure requirement of the transmission is highly dependent on the operating conditions of the transmission. Because the pumps 17 and 18 are driven by the internal combustion engine 16, the pump speed is equal to that of the internal combustion engine 16. However, control of the pressure and the flow of pumps 17 and 18 is then possible only by making the pumps themselves controllable. This is possible only within certain limits. For this reason EP-A 0 502 263 proposes the use of two pumps, in one of which the pressure can always be relieved if there is no requirement for flow from that pump under specific operating conditions of the transmission. In FIG. 1 this pump is pump 17, the outlet line of which is in connection with line 22 but, by means of on/off controller 31 and line 21, can also be brought into connection with the suction side of pump 17. The efficiency of the transmission is appreciably increased as a result of this measure because useless fluid is no longer pumped round. Nevertheless, the efficiency is still not optimum.

In addition to the auxiliary power train described, there are also other auxiliary power trains which are not optimally sized and do not provide optimum efficiency because the auxiliary power which is available is not in accord with the requirement at the specific point in time. Thus, leakage losses in the hydraulic systems must be compensated for and the transmission, in particular the variator, must be adequately lubricated. This is shown diagrammatically in FIG. 1 by line 27 which, via controller 26, receives fluid which is distributed via spray head 28 over the variator for lubrication purposes. It will be clear that in order to compensate for the leakage losses in general a low flow rate is desired under high pressure and that for lubrication a moderate flow rate under low pressure is desired.

Figure 2:
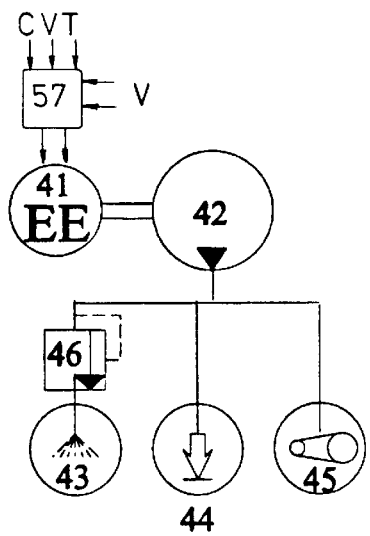
FIG. 2 shows, diagrammatically, a first embodiment of the transmission according to the invention.

In order better to meet the requirements with regard to the desired auxiliary power trains in the transmission, the invention proposes the use of at least one electric motor. Said electric motor is independent of the internal combustion engine, so that the optimum speed for the motor can be selected, certainly if the electric motor is controllable. Furthermore, the electric motor can simply be switched off if there is no need for auxiliary power. This is shown diagrammatically in FIG. 2 for a first embodiment. The electric motor 41 drives pump 42, which pump 42 supplies flow at a certain pressure for the pinching force and adjustment of the variator (symbol 45), to make up for leakage losses (symbol 44) and for lubrication of the transmission (symbol 43). The lubricant flow runs via a vent 46 which removes excess flow from the processes 44 and 45. The electric motor 41 can be influenced by controller 57, which is fed with data from the transmission (CVT) and the vehicle (V).

Figure 3:
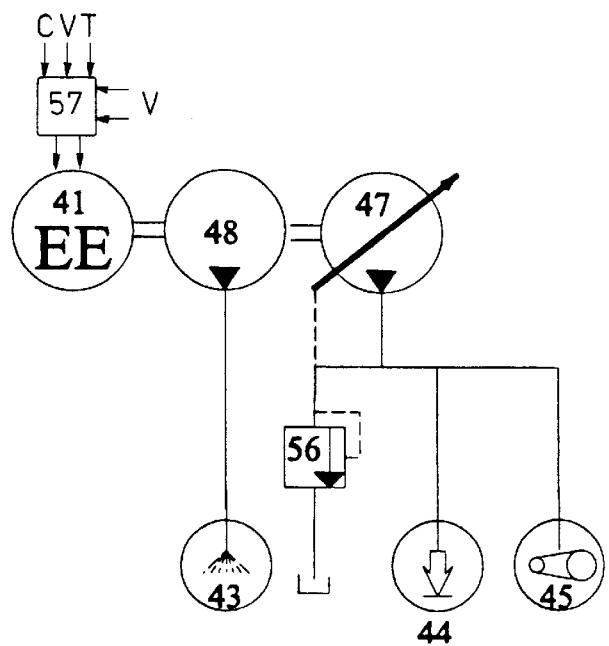
FIG. 3 shows, diagrammatically, a second embodiment of the transmission according to the invention.

In the embodiment according to FIG. 3, the electric motor 41 drives two pumps 47 and 48. Pump 48, in combination with electric motor 41, is optimally matched to the desired flow rate and pressure for the lubrication process 43. Pump 47, which is controllable, is, in combination with electric motor 41, optimally adjusted to supply the flow and the pressure for compensation of leakage losses 44 and the variator/pinching force control 45. Surplus fluid is blown off via valve 56 to a fluid reservoir.

Figure 4:
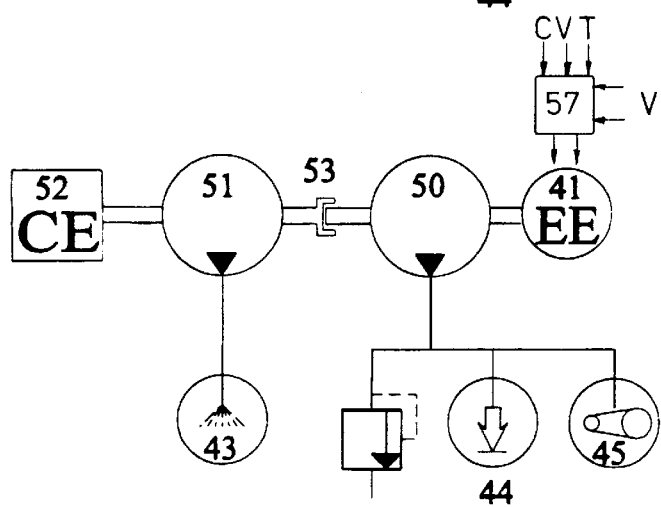
FIG. 4 shows, diagrammatically, a third embodiment of the transmission according to the invention.

FIG. 4 shows an embodiment in which the electric motor 41 again drives a pump 50 for compensation of the leakage losses 44 and the variator/pinching force control 45. A second pump 51, which supplies flows and pressure for the lubrication process 43, is coupled to a drive unit 52. Said drive unit can, for example, be the internal combustion engine 16, which also drives the transmission. In this way a separation is achieved between the low pressure fluid requirement, via pump 51, and the high pressure fluid requirement, via pump 50, which impose different demands. In particular, with this arrangement it can also be possible for the pump 50 to be coupled via coupling 53 to the drive unit. Under steady-state operating conditions of the transmission, where little flow is required for the variator/pinching force control and for compensation of leakage losses, the electric motor can then be switched off and the pump 50 connected by means of the coupling 53 to the drive unit 51. In this way the various fluid flows can be controlled in an optimum manner, with optimum efficiency. In particular coupling 53 is a one-way coupling, for example a freewheel clutch.

Instead of a coupling 53 according to FIG. 4, it is also possible, according to the embodiment in FIG. 5, to use a third pump 54 which is rigidly coupled to the drive unit 52. In this way, when electric motor 41 is switched off or controlled, pump 54 provides the base flow for compensation of the leakage losses 44 and the variator/pinching force control 45, whilst the electric motor, in combination with pump 50, supplies the supplementary flow. This supplementary flow can be optimally matched to the operating conditions of the transmission.

The embodiment in FIG. 6 differs from the embodiment in FIG. 5 in that the pump 55 driven by the electric motor 41 is placed directly between the piston/cylinder assemblies 5, 6 and 7 and, respectively, 11, 12 and 13. With this arrangement the electric motor 41 acts only to pump fluid from the one cylinder chamber 7 to the other cylinder chamber 13 and vice versa, in order thus to control the transmission ratio of the transmission. In this embodiment the electric motor 41 is put to optimum use, with high efficiency. With this arrangement the pump 54, which is driven by the drive unit 52, supplies the supplementary fluid to compensate for the leakage losses and the necessary pressure for the pinching force. In the embodiment according to FIG. 7, pump 54 has the same function, but in this case the electric motor is connected directly to the movable disc 2.

It will be clear that the sizing and the efficiency of the transmission can be optimized by means of a suitable selection of the pumps with regard to their characteristics.

Within the framework of the invention, many more embodiments are conceivable which are considered to fall under the inventive concept. Thus, for example, it is also possible to use an accumulator to make up for a temporary deficiency in the flow and/or to level out irregularities in the flow.

I claim:

1. Continuously variable trans-mission for coupling with a drive unit and for coupling with a driven axle, comprising:
    a variator for adjusting a transmission ratio of the transmission,
    at least a first hydraulic circuit for circulating fluid for transmission control at a high pressure and a second hydraulic circuit for circulating fluid for lubrication of the transmission at a relatively low pressure,
    at least one pump or pump component for feeding at least said first hydraulic circuit at a high pressure, and
    at least one electric motor capable of driving said pump during operation of the transmission independently from a drive unit,
    wherein the transmission is adapted to be coupled to the driven axle during operation of the transmission, and
    wherein said one pump or pump component is adapted to be drivable by the drive unit during essentially steady-state operation of the transmission when little fluid flow is required for variator control and for compensation of leakage losses and by said electric motor during essentially dynamic operation of the transmission when additional fluid flow is required.

2. Continuously variable transmission according to claim 1, wherein said pump or pump component drivable by said electric motor is further drivable by the drive unit which can be connected to the transmission.

3. Continuously variable transmission according to claim 2, wherein the transmission further comprises a non-electrically drivable pump or pump component drivable by said drive unit which can be connected to the transmission for feeding said second hydraulic circuit at low pressure.

4. Continuously variable transmission according to claim 3, wherein said non-electrically drivable pump or pump component drivable by said drive unit which can be connected to the transmission can be connected to said first hydraulic circuit at high pressure.

5. Continuously variable transmission according to claim 4, wherein said pump or pump component drivable by said electric motor can supply a higher flow to said first hydraulic circuit than can said non-electrically drivable pump or pump component which are drivable by said drive unit.

6. Continuously variable transmission according to claim 1, further comprising an additional pump or pump component for said second hydraulic circuit at low pressure,
    wherein both said pump or pump component for said first hydraulic circuit at high pressure and said additional pump or pump component for said second hydraulic circuit at low pressure are drivable by said electric motor.

7. Continuously variable transmission according to claim 1, further comprising two pulleys, wherein each pulley is provided with two discs, at least one disc of which per pulley is axially movable by means of a displacement mechanism, and wherein the displacement mechanism of at least one disc is drivable by said electric motor.

8. Continuously variable transmission according to claim 7, wherein said displacement means for said two pulleys comprise hydraulic control cylinders, and a pump arranged in a hydraulic link between said two cylinders, which last-named pump is drivable by said electric motor.

9. Continuously variable transmission according to claim 7, wherein said displacement mechanism for one pulley is drivable by said electric motor and a drive mechanism for the other pulley comprises a control cylinder which is coupled to a hydraulic circuit.

10. Continuously variable transmission for being driven by a drive unit and having a variable transmission ratio, said transmission comprising:
    at least a one hydraulic circuit to control the transmission ratio;
    a first pump or pump component for circulation of hydraulic fluid in said at least one hydraulic circuit;
    said first pump or pump component being drivable by an electric motor; and
    a second pump in said hydraulic circuit for circulation of hydraulic fluid in said at least one hydraulic circuit,
    one of said first pump and said second pump for being driven by the drive unit during operation of said transmission, and
    said one pump drivable by said electric motor adapted to be driven independently from the drive unit during essentially dynamic operation of said transmission.

11. Continuously variable transmission according to claim 10, further comprising means for controlling said electric motor.

12. Continuously variable transmission according to claim 10, wherein said first pump or pump component is adapted to be drivable by the drive unit during essentially steady-state operation of the transmission.

13. Continuously variable transmission accordingly to claim 12, further comprising a coupling arranged in a drive line between the drive unit and said first pump or pump component.

14. Continuously variable transmission accordingly to claim 10, wherein said second pump is connected to a hydraulic circuit for low pressure.

15. Continuously variable transmission according to claim 10, wherein said first pump or pump component is connected to a hydraulic circuit for high pressure.

16. Continuously variable transmission according to claim 15, wherein both said first pump or pump component and said second pump are adapted to be drivable by said electric motor.

17. Continuously variable transmission according to claim 10, wherein both said first pump or pump component and said second pump can be connected to a hydraulic circuit for high pressure.

18. Continuously variable transmission according to claim 10, wherein one of said first pump or pump component and said second pump has a variable stroke volume.

19. Continuously variable transmission according to claim 10, further comprising an accumulator.

20. Continuously variable transmission according to claim 10, for use in a vehicle having a battery and battery charging circuit establishing a vehicle electric voltage, wherein said electric motor is fed with a current, the voltage of which is higher than the vehicle electric voltage.

* * * * *